INVENTOR.
JAMES K. STEVENS
BY John W. Klooster
ATTORNEY

3,563,845
THERMAL INSULATING COMPOSITE STRUCTURE
James K. Stevens, Brimfield, Mass., assignor to Monsanto Company, St. Louis, Mo., a corporation of Delaware
Filed Apr. 22, 1969, Ser. No. 818,459
Int. Cl. B32b 5/18, 27/40
U.S. Cl. 161—160          5 Claims

ABSTRACT OF THE DISCLOSURE

Improved integral, three-layered plastic, thermally insulating composites each having an impact resistant solid facing layer of a monovinyl aromatic compound/alpha-electronegatively substituted ethene compound interpolymer system, a layer of cellular polyurethane, and an elastomeric interlayer positioned between these two layers. The resulting composites have improved impact resistance as respects the solid facing layer.

BACKGROUND

In the art of plastic composites, it has heretofore been conventional to bond a relatively thick layer of relatively rigid, thermally insulating (or acoustically insulating), cellar, plastic material to a relatively thin layer of solid impact resistant plastic sheeting especially sheeting comprising an interpolymer system of monovinyl aromatic compound and an alpha-electronegatively substituted ethene compound. Such composites are useful in many industrial and commercial applications, including construction materials, refrigerator cabinets, etc.

Such composites, however, suffer from a severe disadvantage in that the solid layer apparently can be more readily cracked when rigidly bonded to the cellular layer than in a free, unbonded form. Such cracks originate from exterior impacts generally localized in character. Actual crack propagation through, or in. such solid layer is a relatively low energy process while the actual point of crack initiation or formation is usually associated with a relatively high mechanical force. Apparently (though there is no intent to be bound by theory herein) the solid layer cracks more readily when bonded to the cellular layer because then the crack initiation site is in the relatively more brittle, more rigid, cellular layer and this site becomes a locus for easier initiation of cracks than when the solid layer is in a free, unbonded form. The rigidity of the cellular plastic seems to prevent or impair the shock absorbance normally associated with the free, unbonded solid layer.

Heretofore, it has been conventional to overcome such a degradation of impact resistance in solid plastic sheeting of such an interpolymer system when employed in such composites by using thicker or tougher sheeting. Such a procedure is disadvantageous since it not only can add appreciably to the cost of a resulting composite, but also it can add undesirable weight to such resulting composite and present subsequent application problems.

It has now been discovered, however, that when in such a composite one uses as the solid layer an interpolymer system of monovinyl aromatic compound and an alpha-electronegatively substituted ethene compound, and positions between such solid layer and such cellular layer an elastomeric interlayer, the toughness or impact resistance of the solid layer is surprisingly and unexpectedly improved. This improvement in impact resistance is achieved without adversely affecting the desired good adhesion characteristics between layers, and, at the same time, does not adversely affect the good structural rigidity characteristics desired in such composites. In addition, within composite, the combined thickness of solid layer and interlayer can be thinner than the thickness of a single thick layer of solid layer used alone and still achieve a product composite having unexpectedly good impact resistance in the solid facing layer.

Such new three-layer systems find value in a number of industrial and commercial applications, for example, they are useful as building or container construction materials. When used for instance in the production of refrigerator food liners (that is, a refrigerator cabinet and its door), the resulting liners characteristically display superior shelf-loading capacity and resistance to bulging or oil canning.

SUMMARY

This invention relates to thermally or acoustically insulating panel-like composites. Each such composite comprises three layers of material.

A first layer is composed of a cellular polyurethane material having spaced, generally parallel faces, and having a transverse thickness of at least about 0.5 cm. (preferably from about 1 to 20 cm.). The cellular material is characterized by having a foam density greater than about 0.008 gms./cm.$^3$ at 23° C. (preferably from about .015 to .06 gram/cm.$^3$ at 23° C.) when individual cells are substantially all gas filled, and by having a foam compressive modulus greater than about 5 kg./cm.$^2$ at 23° C. (preferably from about 20 to 200 kg./cm.$^2$ at 23° C.). Preferably such cellular material is substantially closed-celled.

A second layer is composed of an organic, elastomeric polymeric solid having spaced, generally parallel faces, and having a transverse thickness of from about .01 to 2.5 mm. (preferably from about .02 to 2 mm.). The elastomeric solid comprises a saturated or unsaturated rubber which, when in a layered form as indicated is characterized by having an apparent tensile modulus of elasticity of from about 2 to 500 kg./cm.$^2$ at 23° C. (preferably from about 3 to 100 kg./cm.$^2$ at 23° C.) and by having a tensile elongation to fail of at least about 100 percent (preferably from about 500 to 1000).

A third layer is composed of an organic, rigid, polymeric solid having spaced, generally parallel faces, and having a transverse thickness of from about .25 to 25 mm. (preferably from about .75 to 3 mm.). The solid comprises an interploymer system of monovinyl aromatic compound and alpha-electronegatively substituted ethene compound, which, when in the layered form as indicated, is characterized by having an apparent tensile modulus of elasticity of from about 7000 to 55,000 kg./cm.$^2$ at 23° C. (preferably from about 10,000 to 40,00 kg./cm.$^2$), by having a tensile elongation to fail of at least about 5 percent at 0° C. (preferably from about 7 to 30 percent at 0° C.) by having an independent impact strength greater than about 1 kg.-m. falling dart at 2.5 mm. thickness and 23° C. (preferably from about 2 to 5 kg.-m, all same conditions).

The second layer is interposed between, and is generally contiguous with, the first and the third layers in composites of this invention. Also, adjacent faces of said first and said second layers, and adjacent faces of said second and said third layers, respectively, are continuously and directly bonded to one another.

For purposes of this invention, foam density, foam compressive modulus, apparent tensile modulus of elasticity, tensile elongation to fail, and the like, are each conveniently measured using ASTM Test Procedures or equivalent.

A suitable falling dart impact strength measurement test procedure is as follows:

A falling dart drop testing apparatus like that described in ASTM D-1709-59T is used. The dart has a 1.5 inch diameter hemispherical head fitted with a 0.5 inch diameter steel shaft 8 inches long to accommodate removable weights. A pneumatic dart release mechanism is positioned so that the dart is dropped 26 inches onto the surface of the test specimen. Then test specimen is clamped and held firmly between steel annular rings with an inside diameter of 5 inches. The clamping mechanism is aligned so that the dart strikes the center of the test specimen. The test specimens are preferably 6 inch by 6 inch flat plastic sheets. Specimen thicknesses should not deviate more than 5 percent from the nominal or average thickness.

In a test, the specimen is placed in the clamping mechanism, and the dart is loaded with the weight at which 50 percent failure is expected. Then, the test specimen is impacted with the dart and examined for cracks (failure is designated by any crack in the specimen). A new specimen is used for each impact. In the event that the specimen fails (or does not fail), one decreases (or increases) the weight in increments of 0.25 pound until the procedure produces a failure-non-failure (or non-failure-failure) sequence. The resuls are recorded and the test is preferably continued until at least 15 specimens have been thus tested.

The calculation procedure is as follows:

(A) record the number of impacts tested after the failure-non-failure (or non-failure-failure) point is reached (N),
(B) add together the dart weights for the N impacts (W),
(C) divide W by N ($W_{50}$),
(D) multiply $W_{50}$ by the drop height (26″) to obtain the 50 percent fail falling dart impact ($F_{50}$).

To determine falling dart impact for composites, the following modified procedure may be used. The same dart drop testing apparatus as above is used, except that the dart has a one-inch diameter hemispherical head and the test specimen is not clamped, but is placed on a flat, hard surface. Test specimens are preferably 4 inch by 4 inch flat composites. The procedure and calculations are described as above.

In this invention, the term "cellular polyurethane" has reference to a polyurethane, the apparent density of which is decreased substantially by the presence of numerous cells disposed in a generally uniform manner throughout its mass. These cells are preferably discrete in this invention, and the gas phase of each cell is preferably discrete in this invention, and the gas phase of each cell is preferably independent of that of the other cells in a given cellular polyurethane layer. For purposes of this invention, a cellular polyurethane may have its individual discrete cells filled with a material other than air, for example, a fluorinated hydrocarbon, such as trichlorofluoromethane, or the like. The density of a cellular polyurethane employed in the present invention is conveniently measured at about 23° C. when individual discrete cells are substantially all gas filled.

COMPONENTS MATERIALS

In general, any cellular polyurethane having the above-described characteristics can be used as the first layer in preparing the composites of this invention, as indicated above. Such materials are well known to those of ordinary skill in the art of plastics.

Similarly, and in general, any elastomeric solid having the above-described characteristics can be used as the second layer in preparing the composites of this invention as indicated above.

Such an elastomeric solid conveniently comprises a saturated or unsaturated rubber. In general, suitable saturated and unsaturated rubbers for use in this invention have a glass phase or second order transition temperature below about 0° C. (preferably below about −25° C.), as determined, for example, by ASTM Test D-746-52T, and have a Youngs modulus of less than about 40,000 p.s.i. Examples of suitable rubbers include unsaturated rubbers, such as homopolymers or copolymers of conjugated alkadienes (such as butadiene or isoprene), where, in such copolymers, at least 50 percent thereof is the conjugated alkadiene, ethylene/propylene copolymers, neoprene, butyl rubbers, and the like; and saturated rubbers, such as polyurethane rubbers, silicone rubbers, acrylic rubbers, halogenated polyolefin rubbers, and the like.

A preferred class of rubbers for use in this invention are diene polymer rubbers. Examples of diene polymer rubbers include, for example, natural rubber having isoprene linkages, polyisoprene, polybutadiene (preferably one produced using a lithium alkyl or Ziegler catalyst), styrenebutadiene copolymer rubber, butadiene acrylonitrile copolymer rubber, mixtures thereof and the like. Such rubbers include homopolymers and interpolymers of conjungated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the ethylstyrenes, p-tert-butylstyrene, etc.; and alpha-alkylstyrene, such as alpha-methylstyrene, alpha-ethylene, alpha-methyl-p-methylstyrene, etc.; vinyl naphthalene, etc.); arhalo monovinylidene aromatic hydrocarbons (i.e. the o-, m-, and p-chlorostyrenes, 2,4-dibromostyrene, 2-methyl-4-chlorostyrene, etc.); acrylonitrile, methacrylonitrile; alkyl acrylates (e.g. methyl acrylate, butyl acrylate, 2-ethylhexyl acrylate, etc.); the corresponding alkyl methacrylates, acylramides (e.g. acrylamide, methacrylamide, N-butyl acrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

A more preferred group of diene polymer rubbers are those consisting essentially of 75.0 to 100.0 percent by weight of butadiene and/or isoprene and up to 25.0 percent by weight of a monomer selected from the group consisting of monovinylidene aromatic hydrocarbons (e.g. styrene) and unsaturated nitriles (e.g. acrylonitrile), or mixtures thereof. Particularly advantageous substrates are butadiene homopolymer or an interpolymer of 90.0 to 95.0 percent by weight butadiene and 5.0 to 10.0 percent by weight of acrylonitrile or styrene.

Another preferred class of rubbers for use in this invention are acrylic rubbers. Typically, such a rubber is formed from a polymerizable monomer mixture containing at least 40 weight percent of at least one acrylic monomer of the formula:

where $R_3$ is a radical of the formula:

$$(C_pH_{2p+1})$$

and $p$ is a positive whole number of from 4 through 12.

Although the rubber may generally contain up to about 2.0 percent by weight of a crosslinking agent, based on the weight of the rubber-forming monomer or monomers, crosslinking may present problems in dissolving the rubber in monomers for a graft polymerization reaction (as when one makes an interpolymer system as described in more detail hereinafter). In addition, excessive crosslinking can result in loss of the rubbery characteristics. The crosslinking agent can be any of the agents conventionally employed for crosslinking rubbers, e.g. divinylbenzene, diallyl maleate, diallyl fumarate, diallyl adipate, allyl acrylate, allyl methacrylate, diacrylates and dimethacrylates of polyhydric alcohols, e.g. ethylene glycol dimethacrylate, etc.

Similarly, in general, any rigid solid plastic having the characteristics above described can be used as a third layer in the composites of this invention, as indicated above. As used herein, the terminology "an interpolymer system of monovinyl aromatic compound and alpha-electronegatively substituted ethenes" has reference to:

(A) interpolymers formed by polymerizing a monovinyl aromatic compound with an alpha-electronegatively substituted ethene, (B) interpolymers formed by polymerizing a monovinyl aromatic compound, an alpha-electronegatively substituted ethene, and a conjugated alkadiene monomer.

(C) mechanical blends of such interpolymers (A) and/or (B) with a preformed saturated or unsaturated rubber (such rubbers being as just above described), one presently preferred such rubber being one derived from a conjugated alkadiene monomer which is either homopolymerized or copolymerized with another component, especially a monovinyl aromatic compound or an alpha-electronegatively substituted ethene, or both, (D) graft copolymer blends of such interpolymers (A) and/or (B) produced by polymerizing the monomers used to make such interpolymers in the presence of a preformed saturated or unsaturated rubber (as characterized above), (E) mixtures of (A), (B), (C) and/or (D).

In general, such an interpolymer system has a number average molecular weight ($\overline{M}_n$) ranging from about 20,000 through 120,000, and the ratio of weight average molecular weight ($\overline{M}_w$) to number average molecular weight $$\overline{M}_w/\overline{M}_n$$

ranges from about 2 through 10.

Optionally, such an interpolymer system may have chemically incorporated thereinto (as through polymerization) a small quantity, say, less than about 2 weight percent based on total interpolymer system weight, of a crosslinking agent such as a divinyl aromatic compound, such as divinyl benzene, or the like. Also optionally, such an interpolymer system may have chemically incorporated thereinto (as through polymerization) a small quantity, say, less than about 2 weight percent based on total interpolymer system, of a chain transfer agent, such as an unsaturated terpene, like terpinolene, an aliphatic mercaptan, a halogenated hydrocarbon, or the like. Such interpolymer systems and methods for their preparation are known to the prior art and do not constitue as such as part of the present invention.

Suitable monovinyl aromatic compounds for use in such interpolymer systems include styrene (preferred); alkyl-substituted styrenes, such as ortho-, meta-, and para-methyl styrenes, 2,4 - dimethylstyrene, para - ethylstyrene, or alpha-methyl styrene; halogen substituted styrenes, such as ortho-, meta-, and para-chlorostyrenes, or bromostyrenes, 2,4-dichlorostyrene; and mixed halogen plus alkyl-substituted styrenes, such as 2-methyl-4-chlorostyrene; vinyl naphthalene; vinyl anthracene; mixtures thereof, and the like. The alkyl substituents generally have less than five carbon atoms, and may include isopropyl and isobutyl groups.

Suitable alpha-electronegatively substituted ethenes for use in such interpolymer systems include those represented by the generic formula:

$$CH_2=\overset{R_1}{\underset{X}{C}}H$$

where

X is selected from the group consisting of —CN, —COOR$_2$, and —CONHR$_2$,
R$_1$ is selected from the group consisting of hydrogen, —(C$_n$H$_{2n+1}$), (C$_n$H$_{2n}$)—CN, and —(C$_n$H$_{2n}$)—COOR$_2$,
R$_2$ is selected from the group consisting of hydrogen, and —(C$_m$H$_{2m+1}$),
$n$ is an integer of from 1 through 4, and
$m$ is an integer of from 1 through 8.

Suitable ethene nitrile compounds of Formula 1 include acrylonitrile (preferred), methacrylonitrile, ethacrylonitrile, 2,4-dicyanobutene-1, mixtures thereof, and the like.

Suitable acrylic compounds of Formula 1 include unsaturated acids, such as acrylic acid and methacrylic acid; 2,4-dicarboxylic acid butene-1, unsaturated esters, such as alkyl acrylates (e.g. methyl acrylate, ethyl acrylate, butyl acrylate, octyl acrylate, etc.), and alkyl methacrylates (e.g. methyl methacrylate, ethyl methacrylate, butyl methacrylate, octyl methacrylate, etc.); unsaturated amides, such as acrylamide, methacrylamide, N-butyl acrylamide, etc.; and the like.

Suitable conjugated alkadiene monomers for use in such interpolymer systems include butadiene, 3-methyl-1,3-butadiene, 2-methyl-1,3-butadiene, piperylene chloroprene, mixtures thereof and the like. Conjugated 1,3-dienes are preferred.

In interpolymer systems of type (A) above, the amount of chemically combined monovinyl aromatic compound typically ranges from about 20 to 95 weight percent, and preferably from about 50 to 75 weight percent (based on total weight of such interpolymer), while, correspondingly, the amount of chemically combined alkene nitrile typically ranges from about 80 to 5 weight percent, and preferably from about 40 to 10 weight percent. Examples of such interpolymer systems include styrene/acrylonitrile copolymers, styrene/acrylate copolymers, and the like.

Examples of interpolymer systems of type (B) above include especially copolymers of styrene, acrylonitrile, and butadiene. In such interpolymers, the relative proportions of each of the monovinyl aromatic compound and the alkene nitrile remain as in interpolymer systems of type (A), while the amount of chemically combined conjugated alkadiene monomer typically ranges up to about 25 weight percent, and preferably from about 5 to 20 weight percent (based on total weight of such interpolymer).

These interpolymer systems of types (A) and (B) may, if desired, contain up to about 7 percent by weight of one or more other copolymerizable ethylenically-unsaturated monomers, such as dialkyl maleates, and fumarates (e.g. the dimethyl, diethyl, dibutyl, and dioctyl maleates, and fumarates, etc.); conjugated dienes (e.g. butadiene, isoprene, etc.); and the like. Also, if desired, the interpolymers can contain minor amounts, e.g. about 0.05 to 3 percent by weight of a chain transfer agent, such as a higher alkyl mercaptan, alpha-methylstyrene dimer, terpinolene, and the like.

Among the preferred interpolymers are those which consist substantially of about 20 to 95 percent (preferably about 50 to 85 percent) by weight of a combined monovinyl aromatic hydrocarbon and about 80 to 5 percent (preferably about 50 to 15 percent) by weight of combined acrylonitrile, methacrylonitrile, methyl acrylate and/or methyl methacrylate, and mixtures thereof.

Any interpolymer systems of types (A) or (B) employed in addition to a graft copolymer superstrate (see interpolymer system type (B) usually has a specific viscosity of about 0.04 to 0.15, preferably about 0.07 to 0.1 measured as a solution of 0.1 percent of the polymer in dimethylformamide at 25° C.

In interpolymer systems of types (C) and (D), the total weight percentage of rubber present typically ranges up to about 25 weight percent, and preferably from about 5 to 20 weight percent (based on total weight of such a blend). Interpolymer systems of type (D) are preferred, and a particularly preferred such type is a graft copolymer of styrene and acrylonitrile, for example, on a butadiene based rubber. Other unsaturated or saturated rubbers, however, described above can be employed in place of, or in addition to, such a diene type rubber.

In interpolymer systems of type (D), an interpolymer of type (B) forms the graft superstrate while the rubber forms the graft substrate. Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 300–100:100. With graft ratios above 30:100, a highly desirable degree of improvement in various properties generally is obtained.

The interpolymer systems of type (A) and (B) may be produced by various known polymerization techniques, such as mass, emulsion, suspension and combinations thereof. What ever polymerization process is employed, the temperature, pressure and catalyst (if used) should be adjusted to control polymerization so as to obtain the desired product interpolymer. If so desired, one or more of the monomers may be added in increments during polymerization for the purposes of controlling viscosity and/or molecular weight and/or composition. Moreover, it may be desirable to incorporate low boiling organic, inert liquid diluents during a mass polymerization reaction to lower the viscosity, particularly when a rubber is employed. Moreover, the catalyst may be added in increments, or different catalysts may be added at the same time or at different points during the reaction. For example, when a combined mass-suspension process is employed, generally oil-soluble catalysts may be employed; and both low and high temperature catalysts may be advantageously used in some reactions.

The interpolymer systems of type (C) may be prepared by simple, conventional physical intermixing. Conveniently, one uses starting materials in a solid, particulate form, and employs such conventional equipment as a ribbon blender, a Henschel mixer, a Waring Blendor, or the like.

The interpolymer systems of type (D) may be prepared, for example, by polymerizing monomers of the interpolymer in the presence of the preformed rubber substrate, generally in accordance with conventional graft polymerization techniques involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafing of the interpolymer onto the rubber substrate and the polymerization of ungrafted interpolymer to provide a portion of the matrix at the same time. A preferred method of preparation involves carrying out a partial polymerization in a bulk system with the rubber dissolved in a mixture of the ethene monomers and vinyl aromatic monomers, followed by completion of the polymerization in an aqueous suspension system.

Blends may be prepared by blending latices of a graft copolymer and an interpolymer and recovering the polymers from the mixed latices by any suitable means, e.g. drum-drying, spray-drying, coagulating, etc. Preferably, they are prepared by simply comalaxating a mixture of the interpolymer and the hydroxylated graft copolymer at an elevated temperature for a period of time sufficient to provide an intimate fusion blend of the polymers. Blends of graft copolymer and interpolymer can be prepared by simply blending the two polymers together on conventional plastics working equipment, such as rubber mills, screw-extruders, etc.

As suggested above, interpolymer systems of monovinyl aromatic compound and alpha-electronegatively substituted ethenes most desirably employed in the present invention are those wherein at least a portion of such an interpolymer system has been so prepared in the presence of rubber as to cause some degree of chemical combination to occur between the rubber and remaining interpolymer system components. Typically, a small amount of the superstrate interpolymer is not in chemical combination with the rubber substrate because of the less-than-100 percent grafting efficiency of conventional graft copolymerization reactions.

It will be appreciated that any given third layer used in this invention generally comprises at least about 50 weight percent of an interpolymer system of monovinyl aromatic compound and alpha-electronegatively substituted ethenes with the balance up to 100 weight percent thereof being another polymer, such as a polyvinyl chloride, a polycarbonate, a polysulfone, a polyphenyleneoxide, a polyamide, or the like, provided, of course, the particular combination of polymers employed in a third layer has, when formed into such a given third layer, physical characteristics such as described above. Preferably, a third layer comprises at least 90 weight percent of such interploymer system.

It will also be appreciated that any given first layer, second layer, or third layer can have incorporated thereinto minor amounts (say, up to about 15 weight percent total of any given such layer of conventional adjuvants, organic or inorganic fillers, flame retardants, plasticizers, antioxidants, stabilizers, and the like so as to enhance a given set of properties physical, chemical, economic, or the like) in a particular product of the invention. For example, a first, second or third layer could have up to 10 percent plasticizer, up to 15 percent pigment, up to 5 percent stabilizer, and up to about 5 percent miscellaneous other additional additives, such as antioxidants, fillers, bactericides, fungicides, etc., all as those skilled in the art will appreciate.

METHODS OF FABRICATION

While conventional methods are used in making the composite products of this invention, it will be appreciated that some methods are presently more convenient and preferred.

Thus, one perferred method of fabrication commences with a performed above-described third layer in sheet form such as is done by conventional plastic forming procedures as those skilled in the art appreciate. If a three-dimensional shaped configuration is desired in a particular composite product to be manufactured, then it is convenient to make such third layer in the particular configuration desired, as by conventional vacuum forming injection molding technology, or the like, all as those skilled in the art appreciate.

Next, one face of such sheet (for example, the outer face, as when a refrigerator interior cabinet is being made) is coated with a solution or dispersion of the above-described second layer. The polymeric material consituting this layer is conveniently applied in solution or dispersion form by spraying (preferred) painting, dipping, or the like, and thereafter volatiles (the liquid carrier) are removed by evaporation. Solutions or dispersions of such a polymeric material are well known to those of ordinary skill in the art and are not part of this invention; the liquid medium can be aqueous and/or organic. Convenient concentrations of dispersed or dissolved polymeric material therein typically range from about 10 to 90 weight percent (based on total weight), preferably from about 30 to 70. Preferably, the liquid medium used is one which will not cause the third layer to craze or be damaged before such medium evaporates.

Finally, the exposed face of the second layer is coated with the above-described first layer. The thermoset foam material comprising this third layer in this preferred method of fabrication is produced by positioning the two layered structure fabricated as just described in a mold chamber or equivalent and then depositing on such second layer within the mold chamber the chemicals which will generate in situ the desired thermoset closed-celled cellular plastic layer, and allowing the first layer to form in the mold chamber. Afterwards, depending on the particular composite being formed, the mold chamber may be removed to separate the completed composite of this invention.

Observe that the above-preferred fabrication method requires no adhesive system(s) to bond together the second to the first layer and the third to the second layer. The forming procedure produces a product in which the individual contiguous layers are mutually interbonded.

While the above-described preferred fabrication procedure involves two layers generated in situ at time of composite fabrication, those skilled in the art will appreciate that the first, the second and the third respective layers can each be separately formed independently of each other and then bonded together to form a desired composite structure of this invention.

For example, one can commence fabrication of a composite of this invention with a preformed above-described third layer. One face of this third layer is brushed or coated with a solvent, for example, a hydrocarbon solvent such as toluene, hexane, dimethylformamide, or the like. Then against the so-solvent brushed surface is pressed a preformed second layer. The solvent evaporates but before this occurs, the surface of the second layer is sufficiently softened and partially dissolved to cause bonding between adjacent surfaces of the third layer and the first layer. Thus, in this way are laminated together a performed first layer and a performed second layer. Over the exposed face of the second layer is conveniently coated the chemical system which will form the first layer. For example, in the manner as just described above (e.g. the first layer is again formed in situ).

In another method of lamination a preformed third layer is selected and a preformed thermoplastic second layer is selected and the two are bonded together directly by heat and pressure, the heat and pressure being applied against the two sheets while in face-to-face engagement with one another for a time sufficient to effect lamination directly between the two adjacent surfaces. Then, over the exposed face of the second layer, the first layer is formed in situ, for example, as described above. Although any convenient heat lamination conditions can be employed, it is convenient to use temperatures ranging from about 100 to 250° F. and pressures of from about 500 to 3000 p.s.i. (or even higher pressures, as desired) applied for times ranging from about ¼ to 10 minutes.

Another fabrication procedure involves using a preformed third layer. One coats one face of such third layer with a thin layer of an organic solvent liquid, such as an aromatic hydrocarbon, an aldehyde, a ketone, etc. at an application rate of from about ½ to 5 grams per sq. ft. Thereafter, one presses against the so-moistened face of the third layer a preformed second layer using a pressure ranging from about 15 to 50 p.s.i. applied for times of from about ½ to 5 minutes.

Another fabrication procedure involves using a preformed third layer and a solvent solution or dispersion of the second layer (for example, about a 10 weight percent solids solution or dispersion in an organic solvent or liquid as just indicated). The third layer is then coated with such solution so as to produce a layer after solvent or carrier liquid evaporation which is of the appropriate thickness to constitute a second layer of the invention. The solution or dispersion is applied to the third layer by any conventional technique, including painting, casting, spraying, etc. Usual drying times can range up to about 24 hours at room temperatures through drying times can be accelerated using elevated temperatures, as those skilled in the art will appreciate.

In general, any convenient and suitable method of fabrication can be used to make the composite of the present invention.

DESCRIPTION OF THE DRAWINGS

Composites of the present invention and a preferred method of construction thereof are most particularly illustrated in the attached drawings wherein:

FIG. 5 illustrates a third step in such manufacture;

Figure 1:
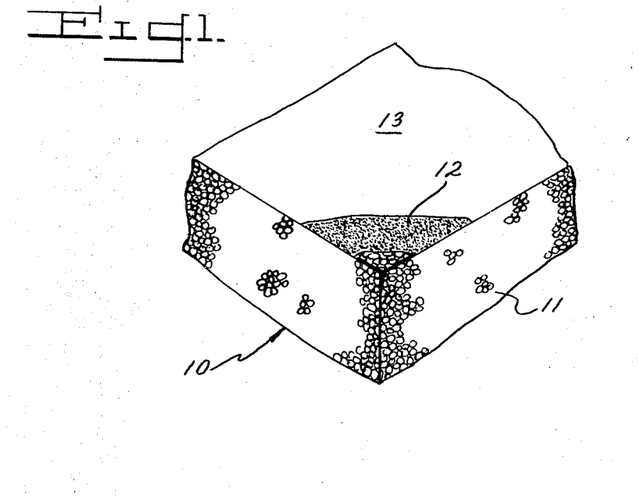
FIG. 1 is an isometric view of a corner region of one embodiment of a composite of this invention, some parts thereof broken away and some parts thereof shown in section.

Turning to these drawings, there is seen in FIG. 1 a view of one embodiment of a composite member of this invention designated in its entirety by the numeral 10. Composite 10 is seen to comprise a first layer 11, a second layer 12, and a third layer 13 integral with one another in face-to-face engagement. Layer 11 is composed of a cellular plastic such as polyurethane foam, or the like; layer 12 is composed of an elastomeric solid such as styrene/butadiene copolymer, or the like; and layer 13 is composed of a semi-rigid plastic such as acrylonitrile/butadiene/styrene, or the like. Individual thicknesses of these respective layers can range as described hereinabove.

Figure 2:
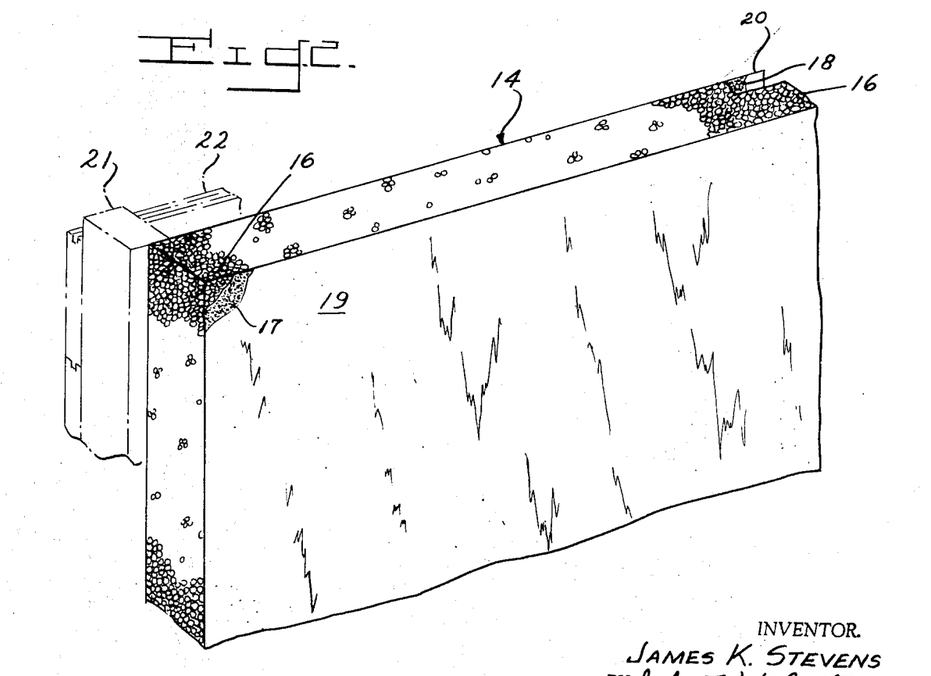
FIG. 2 is a diagrammatic illustration showing another embodiment of a composite of the present invention used as a construction element in the fabrication of a building wall.

In FIG. 2 is seen a composite 14 similar to composite 10 except that composite 14 has two third layers 19 and 20. Each third layer 19 and 20 is bonded to a different second layer 17 and 18, respectively. In turn, each second layer 17 and 18 is bonded to a different opposed face of a first layer 16. Layers 13, 19, and 20 are made by extrusion or the like; layers 12, 17 and 18 are sprayed on as from aqueous dispersions or the like, followed by evaporation of carrier liquid, and layers 11 and 16 are foamed in place using fixturing not shown.

As shown, both composite 10 and composite 14 are in sheet form, and they are usable in a number of ways. For example, composite 14 is shown in FIG. 2 being used as the interior portion of a building wall. Thus, composite 10 is secured to studs 21 (only one shown in dotted lines) such as a conventional wooden so-called two-by-four, or the like as with an adhesive system such as a conventional phenolic or polyvinyl alcohol adhesive or the like or other means. The exterior portion of this wall is composed of tongue and groove boards 22 or the like, as desired. Composite 14 thus avoids the use of separate insulation means between interior portion and exterior portion of a wall.

Figures 3, 4, 6, 7:
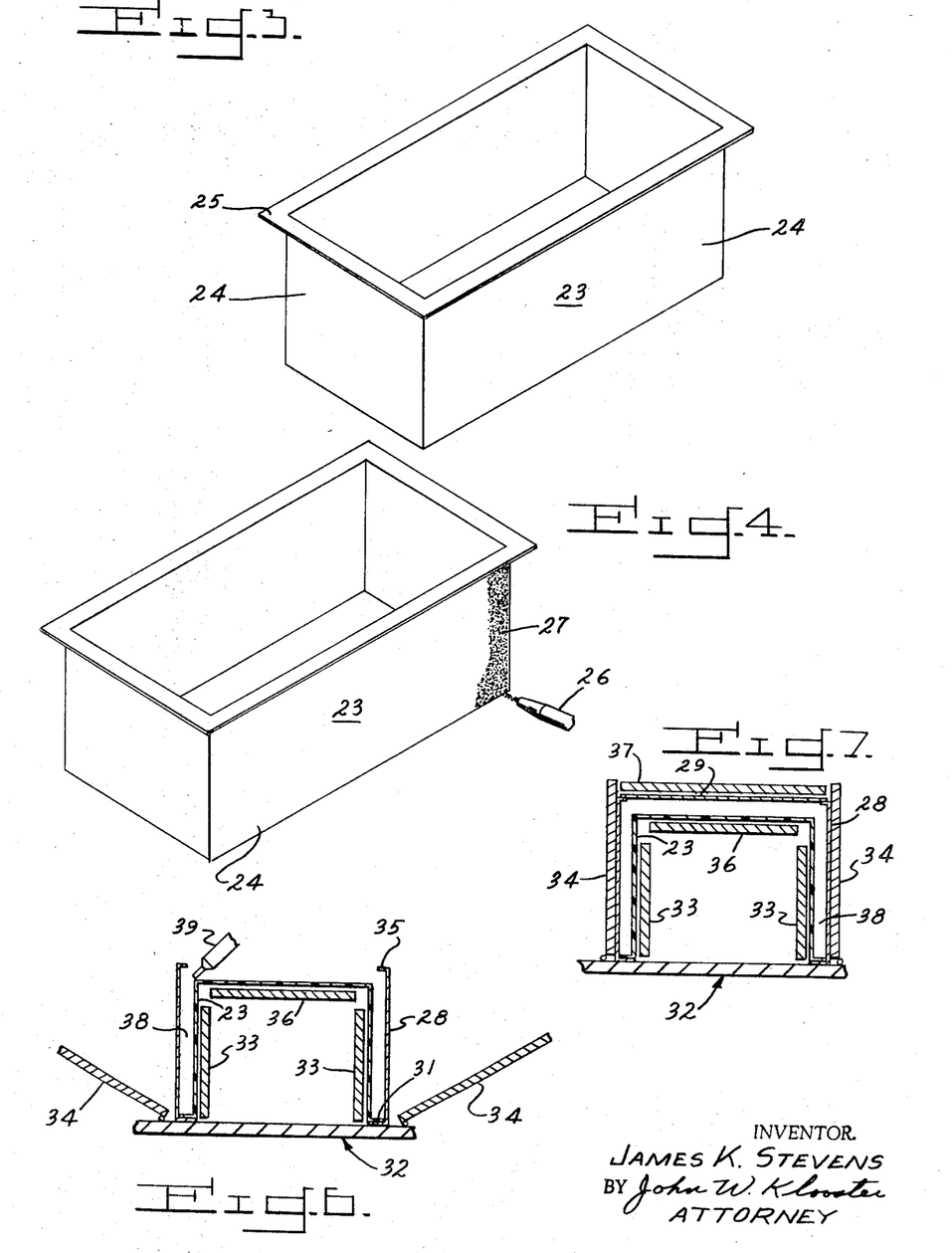
FIG. 3 illustrates a first step in the manufacture of another embodiment of a composite of the present invention wherein the composite is suitable for use as a food liner in a refrigerator cabinet.
FIG. 4 illustrates a second step in such manufacture.
FIG. 6 illustrates another step in such manufacture.
FIG. 7 illustrates a final step in such manufacture.
Figure 7:
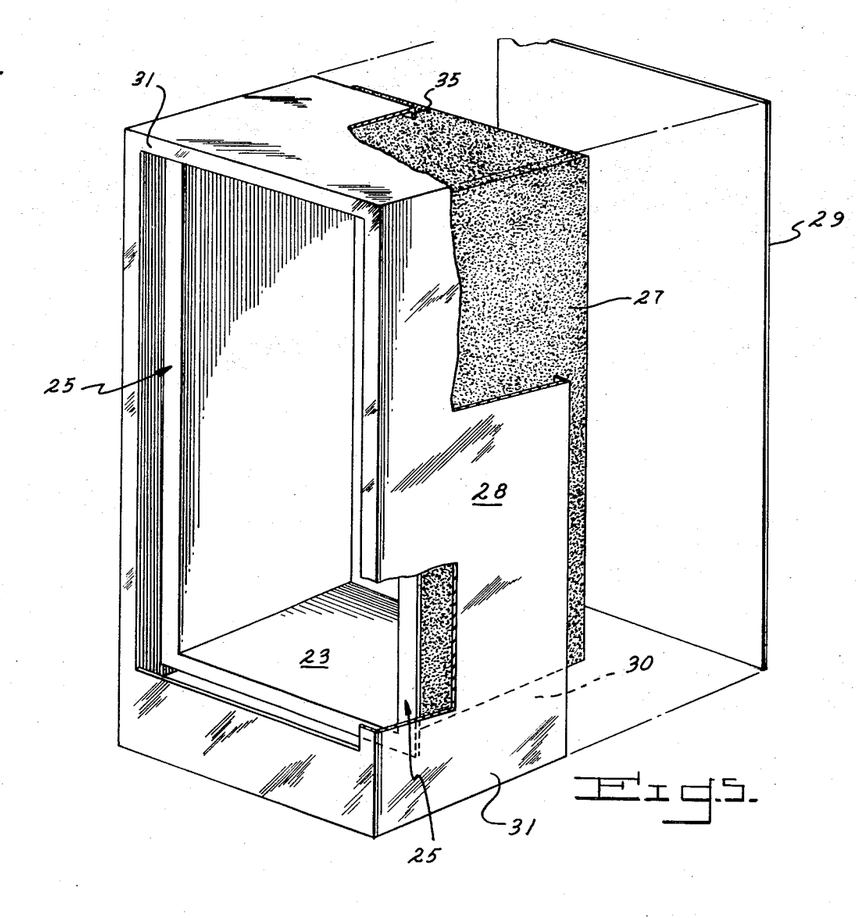

FIGS. 3–9 illustrate production of a refrigerator food liner incorporating a composite structure of this invention. Thus, in FIG. 3 is shown a third layer (such as a sheet of acrylonitrile/butadiene/styrene plastic or the like) which has been formed into the box-like configuration shown, for example, in a single operation by vacuum forming in a molding machine. This third layer comprises entire inside wall portions of a refrigerator cabinet, such third layer being herein designated in its entirety as wall member 23. This wall member 23 can have formed therein protrusions, depressions, or the like (all not shown) to facilitate or accommodate mounting of shelves, etc. therein in the fully assembled, functional refrigerator, as those skilled in the art will appreciate.

The exterior surface regions 24 of third layer 23 are spray coated (see FIG. 4) with a solution or dispersion containing the elastomeric solid comprising a second layer of a composite structure of this invention (as from the nozzle 26 of a spray gun not shown), thereby to deposit on the exterior surface regions 24 a second layer 27 (of styrene/butadiene or the like). The liquid used as the carrier for such solution or dispersion evaporates to leave the layer 27 which is adhered and bonded continuously to surface regions 24.

Next, the double layered laminate construction comprising wall member 23 and second layer 27 is assembled with exterior wall member 28 for a refrigerator cabinet (see FIG. 5). Exterior wall member 28 is conventionally preformed in a separate operation (not shown) and is conventionally composed either of sheet-metal (such as steel or the like), or of plastic (such as the same plastic used in wall member 23). If the latter, then the inner surfaces of exterior wall member 28 can, if desired, be coated (not here shown) with second layer 27. Conveniently, exterior wall member 28 has a separate back wall panel 29. The double layered laminate construction comprising wall member 23 and second layer 27 is moved into exterior wall member 28 through the aperture formed when back wall panel 29 is removed, after which back wall panel 29 is secured to the adjoining portions of the remainder of exterior wall member 28 by any convenient means, such as screws, adhesives, etc. (not shown) extending between panel 29 and inturned flanges 35 on such remainder of member 28, as those skilled in the art will appreciate. The exterior wall member 28 is adapted to have hinges (not shown) and a door latch (not shown) mounted thereon exteriorly so that a door (not shown) can be hung across the front regions of the assembly thereby to provide a complete refrigerator cabinet. Exterior wall member 28 is outfitted with a compartment or space 30 in its lower region to accommodate the refrigerator cooling mechanism (not shown) including compressor, coils, electric motor, and associated components.

Figure 8:
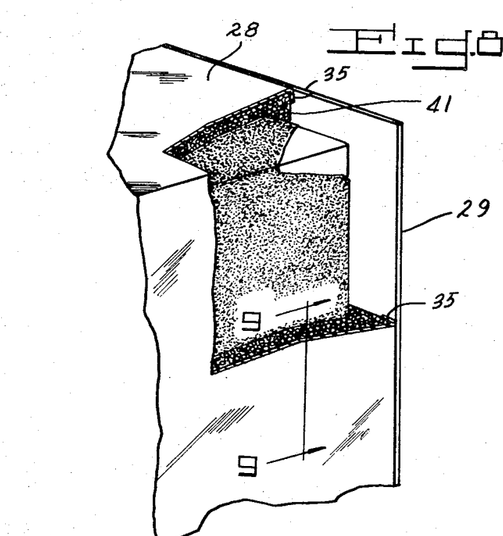
FIG. 8 illustrates the construction of the resulting refrigerator food liner showing an elevational view of a corner thereof, some parts thereof broken away, and some parts thereof shown in section.
Figure 9:
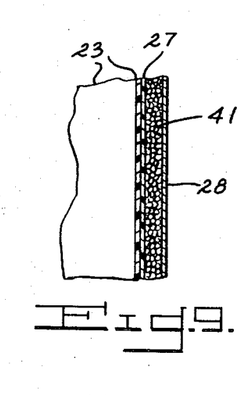
FIG. 9 is a vertical sectional view taken along the line 9—9 of FIG. 8.

The assembly of exterior wall member 28, and double layered laminate construction comprising wall member 23 as the third layer and second layer 27 is now positioned in a supporting frame assembly designated in its entirety by the numeral 32 (see FIGS. 6 and 7). Frame assembly 32 includes interior and exterior supporting side wall members 33 and 34, respectively, as well as interior and exterior supporting rear wall members 36 and 37, respectively, which cooperate together and function to brace, respectively, adjacent wall portions of wall member 23 and outside surface portions of exterior wall members 28. Suitable bracing and hinge means, generally not shown, are employed in frame assembly 32 to secure frame assembly 32 demountably against such surface portions. Such bracing is desirable and sometimes necessary (depending upon pressures developed) to support the assembly comprising wall members 23 and 28 and associated elements during in situ production of a first layer in the void space 38 now existing between wall member 23 and wall member 28. In this space 38 is injected as through a nozzle 39 a liquid chemical composition which chemically interacts with itself to form a closed cell foam, thereby creating a first layer 41 (see FIGS. 8 and 9) and forming a composite structure of this invention. FIGS. 8 and 9 show the resulting construction and are intended to help make clear the inter-relationships between the various layers one with the other. After first layer 41 is formed, the frame assembly 32 is removed and the now completed refrigerator food liner is used in the manufacture of a complete refrigerator.

EMBODIMENTS

The following examples are set forth to illustrate more clearly the principles and practice of this invention to one skilled in the art and they are not intended to be restrictive but merely to be illustrative of the invention herein contained.

Example 1

A sheet of acrylonitrile/butadiene/styrene plastic material termed ABS herein and available commercially under the trademark "Lustran 461" from Monsanto Company measuring approximately 1 ft. x 2 ft. x 60 mils is prepared by extrusion and cutting. Each sheet has an apparent modulus of elasticity of about 340,000 p.s.i. at 23° C., and elongation to fail of about 25 percent at 23° C. and an independent impact strength greater than about 35 ft./lb. falling dart (at 2.5 mm. thickness and 23° C.), each such sheet in this example constitutes a third layer suitable for use in a composite of this invention, as such terminology is used herein.

One face of each such sheet is spray coated with a dispersion. The spray apparatus used is a so-called De Vilbiss spray gun equipment with a fluid tip designated CGA–15–FF employing about 30 pounds air pressure. This dispersion is in aqueous latex form and contains about 74 weight percent of a copolymer comprising 75 weight percent butadiene and 25 weight percent styrene (available commercially under the trademark "Pliolite 5352" from the Goodyear Tire and Rubber Co.). This dispersion is applied at a rate such that, after application to the sheet surface and after evaporation of the carrier liquid (e.g. water) therefrom, there is left on the sheet surface bonded thereto a generally uniform coating of the styrene/butadiene copolymer. This coating has a thickness of about .002 inch and has an apparent modulus of elasticity of about 200 p.s.i. at 23° C. and an elongation to fail of about 600 percent at 23° C. This coating constitutes a so-called second layer in a composite of this invention as this terminology is used herein.

Each such laminate of third layer and second layer is now placed in an aluminum mold whose void space measures approximately 1 ft. x 2 ft. x 1½". This mold with the laminate therein is now heated to a temperature ranging from 100–140° F., and a sufficient quantity of a mixed urethane foam precursor is injected into the mold void so as to produce in the mold void a final polyurethane foam layer having a foam density of about 2.5 pounds per ft.$^3$. As the foam expands and cures in the mold void, the foam bonds to the second layer. Each such foamed layer so formed also has an apparent compressive modulus greater than about 800 p.s.i. at 23° C. Each foam layer so formed in this example constitutes a first layer in a composite of this invention as this terminology is used herein.

There is thus formed a three-layered composite of this invention. Such composite comprises a first layer, a second layer and a third layer. The completed composite is cut into 4" x 4" squares for impact testing. Each such product square undergoes a falling dart impact test as follows.

A modified falling dart method is used, as follows: A dart with a 1″ diameter nose is weighted and dropped onto the ABS sheet facing of the composite from a height of 3 feet. The amount of weight on the dart is adjusted (see above described procedure for measuring falling dart impact) to obtain the 50% fail point.

Each resulting such composite has a thickness of about 1½″ and a falling dart impact strength (measured against the third layer) of about 13.1 ft./lbs. at 0° F.

This composite is a great improvement over the falling dart impact of 1.2 ft./lbs. obtained on a composite panel prepared in the same mold using the same ABS facing and the same urethane foam, but without the elastomeric interlayer.

the preformed second layer is pressed thereagainst using a pressure of about 30 p.s.i. applied for a time of about 1 min. In Example 12, the second layer is formed by casting the second layer over one face of the third layer. The third layer is coated with about 10 mils of an elastomer-containing organic solution (10% solids) and permitted to dry at room temperature for 24 hours. In all these examples, the third layer is preformed. For each example, the composition of the third layer, of the second layer, and of the first layer, respectively, are each designated in the column entitled "Type" and the number in each example in such respective column for each of the respective layers is explained in a legend following Table 1.

TABLE 1

| | Third layer | | | | | Second layer | | |
|---|---|---|---|---|---|---|---|---|
| | Type | Thickness, (mm.) | Tensile modulus 23° C., kg./cm.² | Tensile fail elongation 23° C., percent | Independent falling dart 23° C., (kg./m.) | Type | Method of application | Layer thickness, mm. |
| Example Number: | | | | | | | | |
| 2 | (1) | 1.5 | 25,000 | 30 | 3.3 | (3) | Spray | .05 |
| 3 | (1) | 2.5 | 25,000 | 30 | 5.5 | (3) | do | .05 |
| 4 | (2) | 1.5 | 20,000 | 40 | 5.5 | (3) | do | .05 |
| 5 | (1) | 1.5 | 25,000 | 30 | 3.3 | (3) | do | .05 |
| 6 | (1) | 1.5 | 25,000 | 30 | 3.3 | (4) | do | .05 |
| 7 | (1) | 1.5 | 25,000 | 30 | 3.3 | (5) | do | .05 |
| 8 | (1) | 1.5 | 25,000 | 30 | 3.3 | (6) | do | .05 |
| 9 | (1) | 1.5 | 25,000 | 30 | 3.3 | (7) | do | .05 |
| 10 | (1) | 1.5 | 25,000 | 30 | 3.3 | (8) | Heat laminated | .025 |
| 11 | (1) | 1.5 | 25,000 | 30 | 3.3 | (9) | Solvent laminated | .25 |
| 12 | (1) | 1.5 | 25,000 | 30 | 3.3 | (10) | Cast film | .075 |
| 13 | (1) | 1.5 | 25,000 | 30 | 3.3 | (11) | Spray | .05 |
| 14 | (1) | 1.5 | 25,000 | 30 | 3.3 | None | | |
| 15 | (1) | 1.5 | 25,000 | 30 | 3.3 | (3) | Spray | .05 |
| 16 | (1) | 1.5 | 25,000 | 30 | 3.3 | (3) | do | .05 |
| 17 | (1) | 1.5 | 25,000 | 30 | 3.3 | (3) | do | .05 |

| | Second layer | | First layer | | | Composite | | |
|---|---|---|---|---|---|---|---|---|
| | Tensile modulus 23° C., kg./cm. | Tensile fail elongation 23° C., percent | Type | Density, g./cm.³ | Compressive modulus 23° C., kg./cm.³ | Thickness, cm. | Composite falling, dart impact, kg./ml. 23° C. | −18° C. |
| Example Number: | | | | | | | | |
| 2 | 28 | 600 | (12) | .04 | 70 | 3.8 | 3.0 | 1.9 |
| 3 | 28 | 600 | (12) | .04 | 70 | 3.8 | 5.0 | 3.1 |
| 4 | 28 | 600 | (12) | .04 | 70 | 3.8 | 5.0 | 3.0 |
| 5 | 28 | 600 | (12) | .07 | 130 | 3.8 | 3.0 | 1.8 |
| 6 | 35 | 500 | (12) | .04 | 70 | 3.8 | 2.8 | 1.8 |
| 7 | 14 | 900 | (12) | .04 | 70 | 3.8 | 2.6 | 1.7 |
| 8 | 18 | 600 | (12) | .04 | 70 | 3.8 | 2.7 | 1.8 |
| 9 | 14 | 650 | (12) | .04 | 70 | 3.8 | 2.7 | 1.7 |
| 10 | 21 | 700 | (12) | .04 | 70 | 3.8 | 3.0 | 1.1 |
| 11 | 11 | 1,100 | (12) | .04 | 70 | 3.8 | 3.3 | 1.3 |
| 12 | 11 | 1,100 | (12) | .04 | 70 | 3.8 | 2.6 | 1.5 |
| 13 | 28 | 800 | (12) | .04 | 70 | 3.8 | 2.3 | 1.6 |
| 14 | | | (12) | .04 | 70 | 3.8 | 0.3 | 0.2 |
| 15 | 28 | 600 | (13) | .055 | 105 | 3.8 | 2.9 | 1.7 |
| 16 | 28 | 600 | (14) | .09 | 150 | 3.8 | 3.0 | 1.8 |
| 17 | 28 | 600 | (12) | .04 | 70 | 2.5 | 2.8 | 1.7 |

Examples 2 through 16

Additional composites of this invention are prepared. The composition, respectively, of third layer, second layer, and first layer, the physical characteristics are all as delineated in Table 1 below. In all such composites, the first layer is produced by following the procedure in Example 1 above, that is to say, the first layer is formed by foaming such in place over the second layer in a mold as described in Example 1. In all these examples, the second layer is spray coated in the manner described in Example 1 above except for Examples 10, 11, and 12. In Example 10, the second layer is preformed and is heat laminated to the third layer using a temperature of about 150° F., a pressure of about 1500 p.s.i., the temperature and the pressure being applied for a time of about 5 min. In Example 11, the second layer is laminated to the third layer by the method of partial solvation. Thus, one face of the third layer is coated uniformly with a thin layer of toluene and Legend of Layer Chemical Composition (the number being as designated in Table 1)

(1) An acrylonitrile/butadiene/styrene plastic material available commercially under the trademark "Lustran 461" from Monsanto Company. This material is produced in sheet form by extrusion.

(2) An acrylonitrile/butadiene/styrene plastic material available commercially under the trademark "Lustran 762" from Monsanto Company. This material is produced in sheet form by extrusion.

(3) A copolymer formed from 70 percent butadiene and 30 percent styrene available commercially in the form of an aqueous latex as a weight percent solids dispersion under the trade designation FRS–221 from the Firestone Tire and Rubber Co.

(4) A polymer of polybutadiene available commercially in the form of an aqueous latex as a weight percent solids dispersion under the trade designation FRS–2004 from the Firestone Tire and Rubber Co.

(5) A polymer of 2-chloro-butadiene-1,3 (sometimes called Neoprene) available commercially in the form of an aqueous latex as a weight percent solids dispersion under the trademark "Vultex 3N–2D" from the General Latex Co.

(6) An acrylic rubber polymer available commercially in the from of an aqueous latex as a weight percent solids dispersion under the trademark "Vultacryl A–115" from the General Latex Co.

(7) A urethane rubber polymer available commercially in the form of an aqueous latex as a weight percent solids dispersion under the trade designation E–502 from the Wyandotte Co.

(8) A urethane rubber film available commercially under the trademark "Perflex" from the Union Carbide Co.

(9) A styrene/butadiene block copolymer available commercially in the form of an aqueous latex as a weight percent solids dispersion under the trademark "Thermoplastic 125" from the Shell Oil Co.

(10) A 10 weight percent solution of (9) in toluene.

(11) A styrene/butadiene block copolymer available as a solution under the trademark "Kraton 101" from the Shell Oil Co. (a five weight percent solution of the polymer in a 50/50 toluene xylene solution).

(12) A polyurethane foam available in the form of a foamable liquid system under the trademark "Vultafoam 16–F–702" from the General Latex and Chemical Corp. The foam formed from this material is a rigid thermoset closed celled trichlorofluoromethane blown structure.

(13) A polyurethane foam available in the form of a foamable liquid system under the trademark "Selectrofoam 6403" from Pittsburgh Plate Glass. The foam formed from this material is a rigid thermoset closed celled trichlorofluoromethane blown structure.

(14) A polyurethane foam available in the form of a foamable liquid system under the trademark "Vultafoam 15–L–204" from General Latex and Chemical Corp. The foam formed from this material is a rigid thermoset partially open-celled, carbon dioxide blown structure.

EXAMPLE 17

Refrigerator cabinet

The following example is described in reference to FIGS. 3–9. In FIG. 3 is shown the inside refrigerator cabinet food liner wall member 23, which has been vacuum formed from a .250 inch thick extruded sheet of ABS plastic ("Lustran 461"). The average wall thickness in the part is .090 inch. The food liner dimensions are 37½" x 20½". Wall member 23 constitutes a third layer of a composite structure of this invention.

The exterior surface regions 24 of wall member 23 are spray coated (FIG. 4) with a 75 percent butadiene, 25 percent styrene copolymer aqueous latex having 74 percent weight solids (Goodyear's "Pliolite 5352") to produce the second layer of a composite structure of this invention. After evaporation of the liquid carrier, the solid, elastomeric layer 27 is left on the wall member.

Next, the double layered construction comprising wall member 23 and layer 27 is assembled together with an exterior wall member 28 in supporting frame assembly 32. The exterior wall member 28 is preformed in a separate operation and is composed of 22 gauge mild steel. The exterior wall member 28 has an inturned flange 31 which is one inch wide, upon which the out-turned one inch flange 25 of the interior food liner 23 is sealed. The space between the interior and exterior cabinets is 1½ inches wide. The separate exterior back panel 29 seats against cabinet flange 35 on the exterior wall member 28.

The distance between the two walls is about 1½ inches and the calculated volume is about 2.9 cubic feet. Hot air (160° F.) from a so-called D&W Hopper Dryer manufactured by so-called Thoreson-McCosh Company is blown into the air space between outer and inner cabinets for approximately two hours. This gives a pre-heat temperature of 130–140° F. to the liner before foaming.

Urethane foam is metered and mixed using a laboratory scale so-called Admiral 100–2FSP two component machine whose output is 9 pounds per minute. Vultafoam 16–F–702 with a free rise density of 2.0 lbs./ft.$^3$ is used. Fifteen percent excess foam is used to insure filling. Thus, the in-place density is 2.3 lbs./ft.$^3$. The time needed to fill is about 44 seconds.

During foaming, the foam is distributed down the sides and across the back of the food liner. The pour is programmed so that the sides and back receive approximately 11 seconds of pour time and the top and bottom receive approximately 5½ seconds.

After introduction of the foam, the back cabinet panel and back support panel are put into place and the support clamps latched. Rise and cure of the foam are allowed to proceed at room temperatures.

The resulting refrigerator food liner after removal from the supporting frame 37 constitutes a composite construction of this invention. The food liner can be conventionally used in the manufacture of a refrigerator cabinet.

The impact strength of the inner cabinet is 15 ft./lbs. measured against the third layer by falling dart impact. This is a significant improvement over the 2 ft./lbs. recorded for a cabinet prepared in the same manner using the ABS facing and the same urethane foam but without the second layer of this invention.

What is claimed is:

1. A plastic, composite, thermally insulating, panellike member, one face of which has impact resistance, said member comprising:

(A) a first layer of a cellular polyurethane having spaced, generally parallel faces and having a transverse thickness of at least about 0.5 cm., said cellular plastic being characterized by:

(1) having a density of at least about .008 gm./cm.$^3$ at 23° C. when individual cells are substantially all gas filled, and (2) having a compressive modulus greater than about 5 kg./cm.$^2$ at 23° C., (B) a second layer of an elastomeric, organic, polymeric solid plastic having spaced generally parallel faces and having a transverse thickness of from about .01 to 2.5 mm., said elastomeric, solid plastic being characterized by:

(1) having a tensile modulus of elasticity of from about 2 to 500 kg./cm.$^2$ at 23° C., and (2) having a tensile elongation to fail of at least about 100 percent at 23° C., (C) a third layer of semi-rigid, solid plastic having spaced, generally parallel faces and having a transverse thickness of from about .25 to 25 mm., said rigid, solid plastic being characterized by:

(1) having a tensile modulus of elasticity of from about 7000 to 55,000 kg./cm.$^2$ at 23° C.

(2) having a tensile elongation to fail of at least about 5 percent at 23° C., (3) having an independent impact strength greater than about 1 kg./cm. falling dart (at 2.5 mm. thickness and 23° C.), and (4) comprising an interpolymer system of monovinyl aromatic compound and electronegatively substituted acrylic compound, (D) said second layer being interposed between, and generally contiguous with, said first and said third layers, and (E) adjacent faces of said first and said second layers, and adjacent faces of said second and said third layers, respectively, being continuously directly bonded to one another.

2. The composition of claim 1 wherein said first layer is composed substantially of a closed-celled cellular polyurethane.

3. The composite of claim 2 wherein said first layer is composed substantially of an open-celled cellular polyurethane.

4. The composite of claim 1 wherein said second layer comprises a styrene/butadiene copolymer.

5. The composite of claim 1 wherein said third layer is composed substantially of a graft copolymer blend of a monovinyl aromatic compound, an alpha-electronegatively substituted ethene, and a conjugated alkadiene.

References Cited

UNITED STATES PATENTS 3,091,946  6/1963  Kesling _______ 161—161X

ROBERT F. BURNETT, Primary Examiner
W. A. POWELL, Assistant Examiner

U.S. Cl. X.R.

52—309; 117—104; 156—79, 244; 161—44, 190; 264—45